United States Patent
Ludlow et al.

(10) Patent No.: US 8,479,345 B2
(45) Date of Patent: Jul. 9, 2013

(54) SPEED CONTROL DRIVE SECTION WITH FAILSAFE VALVE

(75) Inventors: Jed Ludlow, Bountiful, UT (US); Keith Glass, Toronto (CA); Jonathan Warkentin, Toronto (CA); Paul Laursen, North York (CA)

(73) Assignee: TDW Delaware, Inc., Wilmington, DE (US)

( * ) Notice: Subject to any disclaimer, the term of this patent is extended or adjusted under 35 U.S.C. 154(b) by 1001 days.

(21) Appl. No.: 12/539,696

(22) Filed: Aug. 12, 2009

(65) Prior Publication Data

US 2011/0036407 A1 Feb. 17, 2011

(51) Int. Cl.
*F16L 55/38* (2006.01)

(52) U.S. Cl.
USPC .............................. 15/104.061; 15/104.063

(58) Field of Classification Search
USPC .......... 15/104.05, 104.061, 104.062, 104.063
See application file for complete search history.

(56) References Cited

U.S. PATENT DOCUMENTS

| | | |
|---|---|---|
| 2,315,133 A | 3/1943 | Riney et al. |
| 2,332,984 A | 10/1943 | Brackeen |
| 2,418,880 A | 4/1947 | Haynes et al. |
| 2,729,839 A | 1/1956 | Holt, Jr. |
| 2,860,356 A | 11/1958 | Matheny |
| 3,449,662 A | 6/1969 | Wood |
| 3,460,028 A | 8/1969 | Beaver et al. |
| 3,483,466 A | 12/1969 | Crouch et al. |
| 3,495,546 A | 2/1970 | Brown er al. |
| 3,495,626 A | 2/1970 | Nagel |
| 3,539,915 A | 11/1970 | Walters et al. |
| 3,758,050 A | 9/1973 | Watts et al. |
| 4,083,074 A | 4/1978 | Curtis |
| 4,122,575 A | 10/1978 | Sagawa |
| 4,123,847 A | 11/1978 | Bosselaar et al. |
| 4,388,871 A | 6/1983 | Braithwaite et al. |
| 4,411,039 A | 10/1983 | Timmins et al. |
| 4,425,385 A | 1/1984 | Coulter et al. |
| 4,494,584 A | 1/1985 | Rognoni |
| 4,498,932 A | 2/1985 | Kruka |
| 4,509,222 A | 4/1985 | Knapp |
| 4,576,097 A | 3/1986 | Foster |
| 4,590,799 A | 5/1986 | Brown et al. |
| 4,676,310 A | 6/1987 | Scherbatskoy et al. |
| 4,717,875 A | 1/1988 | Lara |
| 4,769,598 A | 9/1988 | Krieg et al. |
| 4,945,775 A | 8/1990 | Adams et al. |
| 4,964,059 A | 10/1990 | Sugaya et al. |
| 5,088,336 A | 2/1992 | Rosenberg et al. |

(Continued)

FOREIGN PATENT DOCUMENTS

EP 0859930 5/2000

OTHER PUBLICATIONS

International Search Report and Written Opinion issued by the International Searching Authority (ISA/US) on Oct. 20, 2010 in PCT/US2010/045158.

*Primary Examiner* — Laura C Guidotti
(74) *Attorney, Agent, or Firm* — Gable Gotwals (57) ABSTRACT

A system and method for retrieving a pipeline tool from a pipeline includes a speed control drive section that includes a primary bypass flow valve and a failsafe valve located in a central bypass flow passageway of the drive section. The failsafe valve is placed under the control of a controller. The controller is programmed to release the failsafe valve under prescribed failure conditions. An actuating means moves the failsafe valve between a normally opened positioned and a closed position in response to the controller.

12 Claims, 6 Drawing Sheets

U.S. PATENT DOCUMENTS

| | | |
|---|---|---|
| 5,111,623 A | 5/1992 | Lehmann |
| 5,208,936 A | 5/1993 | Campbell |
| 5,426,367 A | 6/1995 | Martin et al. |
| 5,659,142 A | 8/1997 | Lima et al. |
| 5,795,402 A | 8/1998 | Hargett, Sr. et al. |
| 6,070,285 A | 6/2000 | Geppert |
| 6,098,231 A | 8/2000 | Smith et al. |
| 6,190,090 B1 | 2/2001 | Campbell et al. |
| 6,232,773 B1 | 5/2001 | Jacobs et al. |
| 6,243,657 B1 | 6/2001 | Tuck et al. |
| 6,370,721 B1 | 4/2002 | Torres, Jr. et al. |
| 6,553,602 B1 | 4/2003 | Skarupa et al. |
| 6,752,175 B1 | 6/2004 | Willschuetz et al. |
| 6,880,195 B1 | 4/2005 | Bahari et al. |
| 6,944,902 B1 | 9/2005 | Richter et al. |

SPEED CONTROL DRIVE SECTION WITH FAILSAFE VALVE

BACKGROUND OF THE INVENTION

This invention relates generally to inline inspection tools and techniques used to inspect piping and pipelines. More specifically, the invention relates to devices for controlling the speed of an inline inspection tool as the tool travels through a pipe.

Inline inspection tools and techniques are widely used in the piping and pipeline industry to provide information on the wall conditions of pipes. For example, as a magnetic flux leakage tool travels through the interior of the pipe, a magnetic circuit is created between the pipe wall and the tool. The magnetic flux saturates the wall and sensors located on the tool sense and collect data on flux leakage and interruptions in the magnetic circuit. The data are then analyzed to identify where metal loss has occurred due to corrosion, gouges, or other defects and determine the size of the metal loss at each location.

Many large diameter gas pipelines run at flow speeds that are outside the acceptable range for most inline inspection techniques. The underlying physics of many inline inspection techniques make adequate detection and sizing of anomalies at these higher speeds very challenging. For pipelines running at these high speeds, it would be desirable to allow some of the product to simply pass through the inspection tool to slow the speed of the tool without inhibiting the speed of the product flow. Unfortunately, the drive section of a typical inline inspection tool is designed to provide a tight seal, allowing very little bypass flow through the drive section.

Another concern with inline inspection tools is that there is a potential for the tool to become stalled or stuck within the pipeline. Pipeline debris and build-up may slow the tool below a desired minimum speed or may stop the tool entirely. To keep the tool moving, various passive and active speed control means have been developed. Passive control devices use pressure flow to actuate a primary bypass flow control valve that allows more or less product flow through the tool. Active control devices generally employ some combination of electrical, mechanical, or hydraulic means to actuate the bypass flow control valve. In some cases, however, the valve may fail while it is in the open position, causing the tool to stop moving.

Therefore, a drive section is needed that allows just enough bypass flow through the drive section to lower the tool speed yet still ensure that the tool successfully passes completely through the pipeline and provides a means for controlling bypass flow should the primary bypass flow control valve fail.

SUMMARY OF THE INVENTION

A system and method for retrieving a pipeline tool from an interior space of a pipeline, includes a speed control drive section that uses a primary bypass flow control valve to regulate bypass flow through the drive section. The primary valve is in communication with a controller that moves the primary valve fore and aft in response to deviations in speed of the drive section (or a tool being towed by the drive section). A failsafe valve is located in the bypass flow passageway and is held in an open position by a retaining means. The retaining means is responsive to a timed event, such as a predetermined amount of time for the tool to remain in the pipeline, or to a failure event, such as the primary valve failing in the opened position and the drive section no longer moving forward. Under the prescribed conditions, the retaining means releases the failsafe valve, allowing the failsafe valve to move to a closed position. In the closed position, the failsafe valve prevents bypass flow through the drive section or limits the amount of bypass flow to a predetermined minimum amount. In either case, the resulting pressure differential is sufficient for driving the drive section forward in the pipeline.

DETAILED DESCRIPTION OF THE PREFERRED EMBODIMENTS

Preferred embodiments of a speed control drive section according to this invention will now be described by making reference to the drawings and the following elements illustrated in the drawings:

10 Drive section
11 Longitudinal body
13 Forward end
15 Rearward end
17 Central passageway
19 Throat area/venturi
21 Driving cup or sealing element
23 Towing means
25 Odometer
27 Controller/control means
30 Primary bypass flow control valve
50 Failsafe valve 51 Divider housing
53 Leaf
55 Spring-loaded hinge
57 Retaining means
59 Pin
61 Pin receiver Referring to FIGS. 1, 2, 7 & 8, a drive section 10 includes a longitudinal body 11 having a central passageway 17 therethrough. The drive section 10 may be a pipeline cleaning, inspection or maintenance tool or may have towing means 23 for towing a tool such as a magnetic flux leakage inspection tool (not shown). Driving cups 21A and 21B are mounted at forward end 13 and rearward end 15 of body 11, respectively. The driving cups 21 are of a type well-known in the art and provide sealing engagement with the inner wall surface of the pipeline in order to propel drive section 10 (and any tool being towed) forward under differential fluid pressure. Gas or liquid product flow enters drive section 10 at its rearward end 15 and is allowed to flow toward a reduced throat area 19 of central passageway 17. Odometer 25 monitors the speed of the tool or drive section 10 and sends the speed data to a controller 27. Controller 27 may be mounted on drive section 10 or on a tool being towed by drive section 10. Also onboard the drive section but not illustrated here are standard components such as batteries and auxiliary sensors to monitor pressures.

Figure 1:
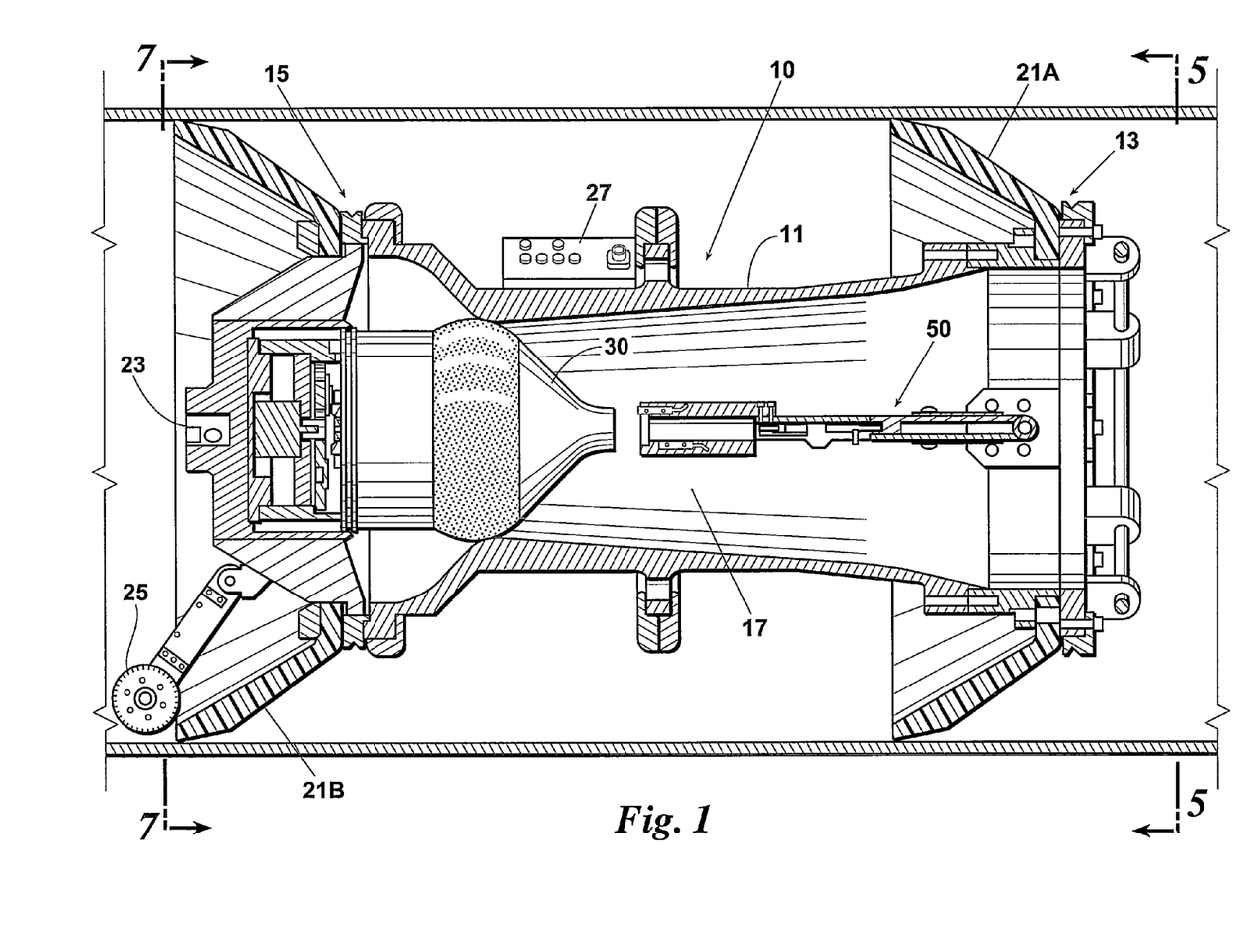
FIG. 1 is a cross-section view of an embodiment of a speed control drive section that includes a primary bypass control valve located in a throat area of the central flow passageway of the drive section and a failsafe valve located forward of the primary bypass control valve. The primary bypass control valve is in the closed position, thereby allowing for a minimum amount of bypass flow through the drive section. The failsafe valve is in the open position, thereby not affecting the amount of bypass flow through the drive section. The drive section includes means for towing an inline inspection tool.
Figure 2:
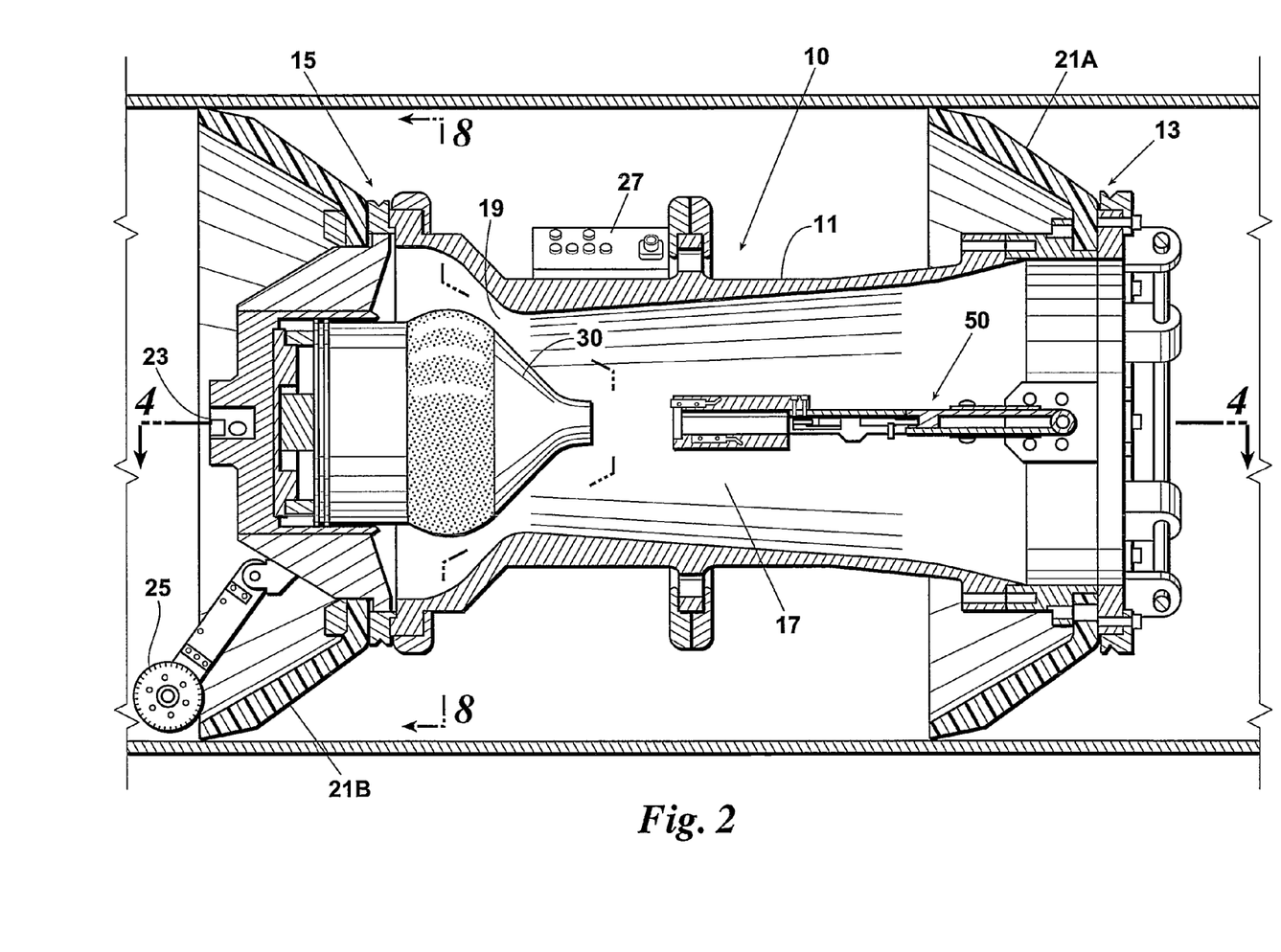
FIG. 2 is a cross section view of the speed control drive section of FIG. 1 illustrating the primary bypass flow control valve in the partially open position, thereby allowing an appropriate amount of bypass flow through the drive section. A notched portion of the failsafe valve receives a pin that holds the valve in the open position.
Figure 3:
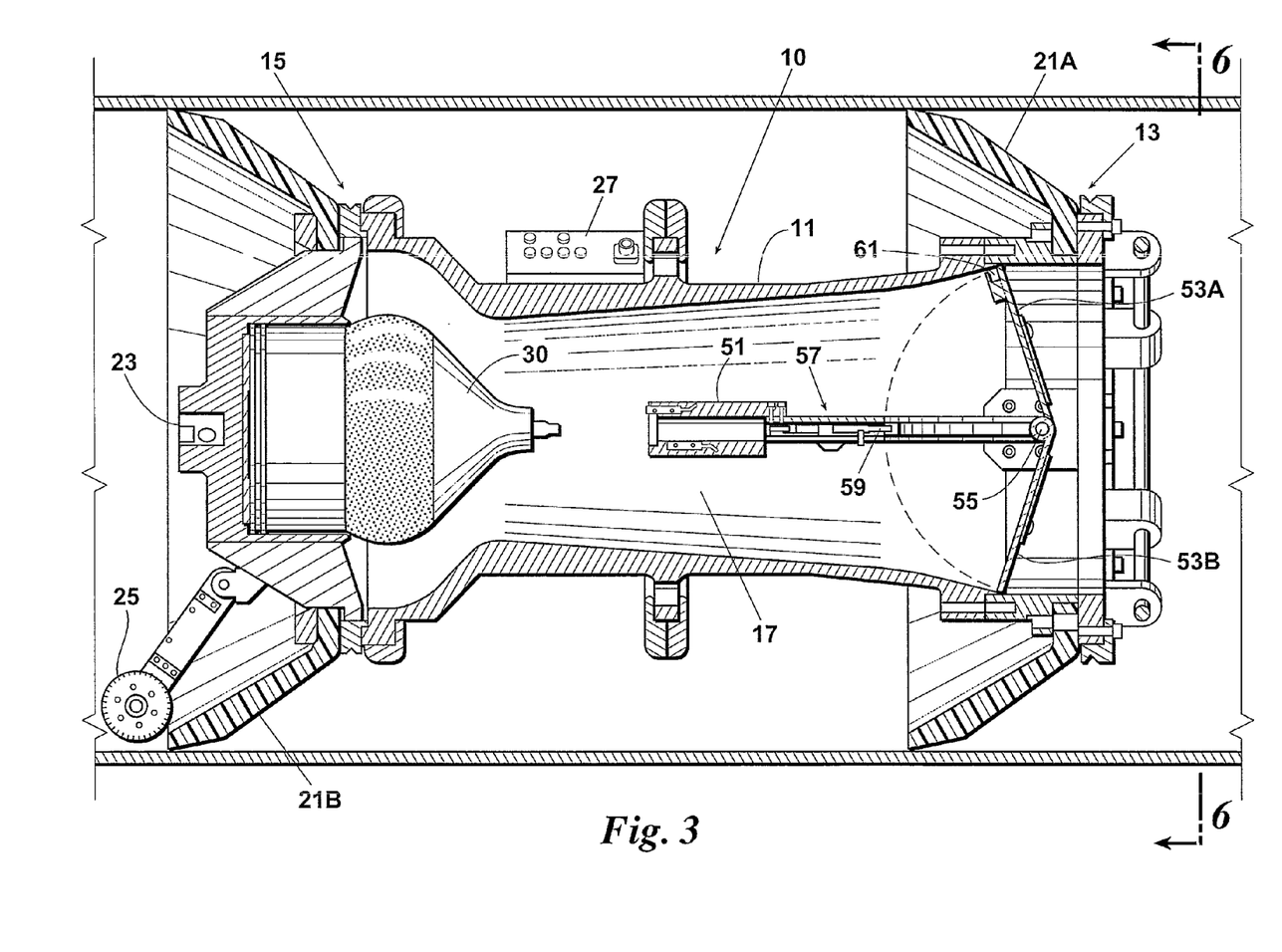
FIG. 3 is a cross section view of the speed control drive section of FIG. 1 illustrating the primary bypass flow control valve remaining in the fully open position due to a valve failure and the failsafe valve, in response, actuating to a fully closed position. Upon failure of the valve, or after the inspection tool has remained in the pipeline for a predetermined amount of time, the pin holding the failsafe valve in the open position retracts and closes the valve. In the closed position, the failsafe valve limits the amount of bypass flow through the drive section so that the drive section may move forward through the pipeline under differential pressure.
Figure 4:
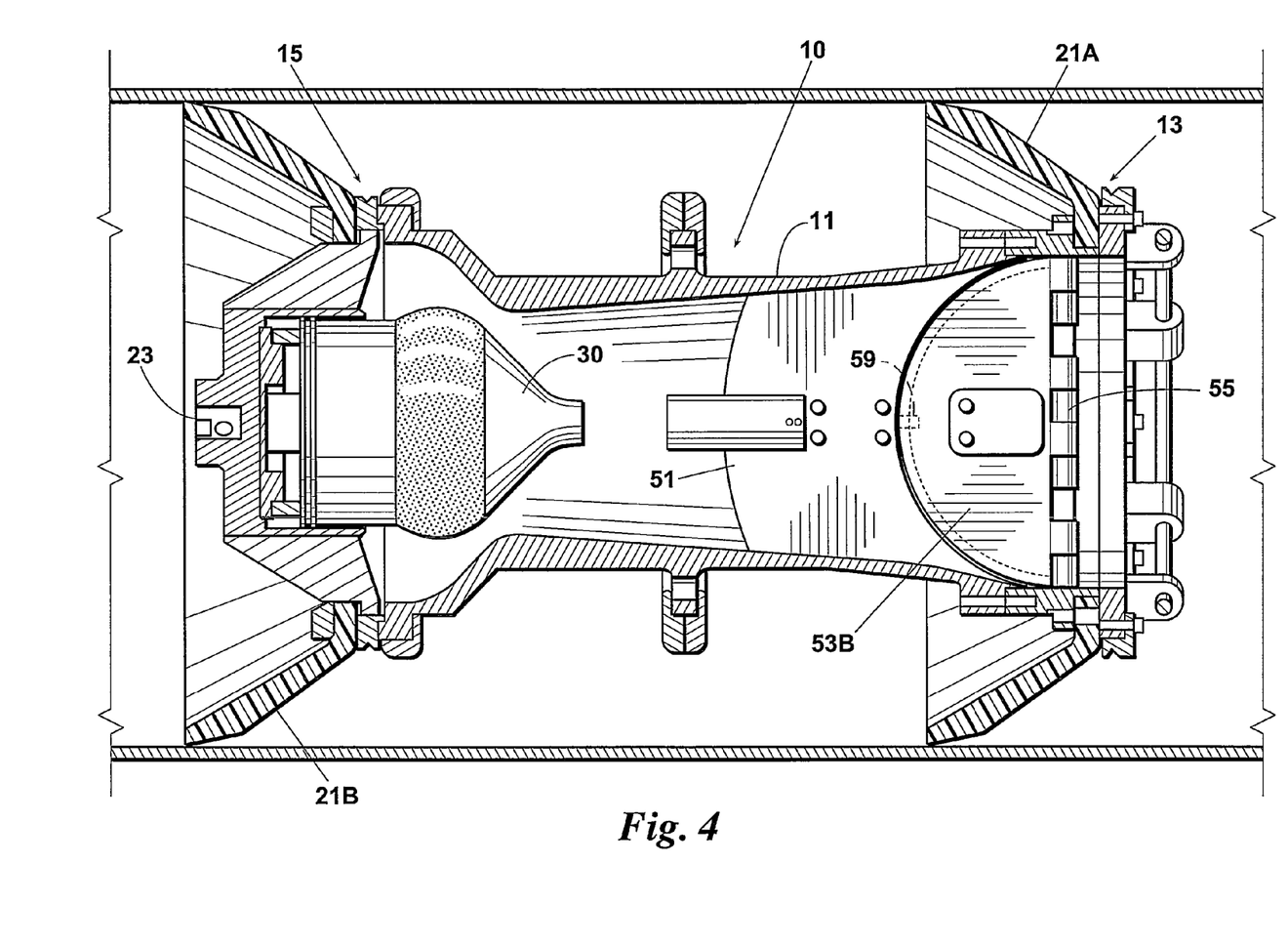
FIG. 4 is a view of the speed control drive section of FIG. 1 taken along section line 4-4 of FIG. 2.
Figure 5:
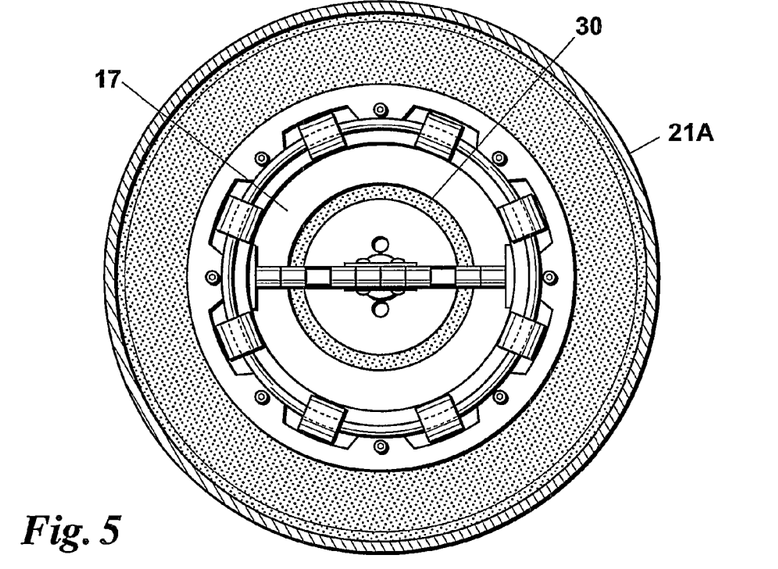
FIG. 5 is a view of the forward end of the drive section of FIG. 1 taken along section line line 1-1 of FIG. 1.
Figure 6:
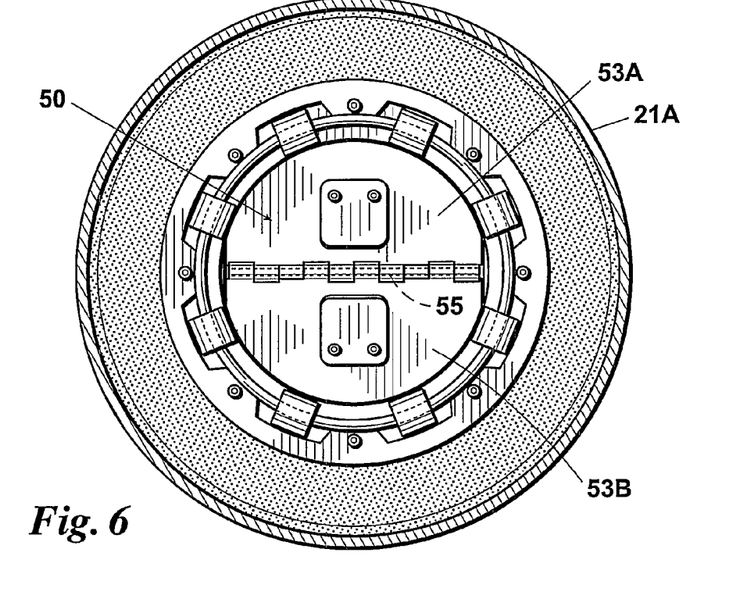
FIG. 6 is a view of the forward end of the drive section of FIG. 1 taken along section line 6-6 of FIG. 3. The failsafe valve is in its fully closed position.
Figure 7:
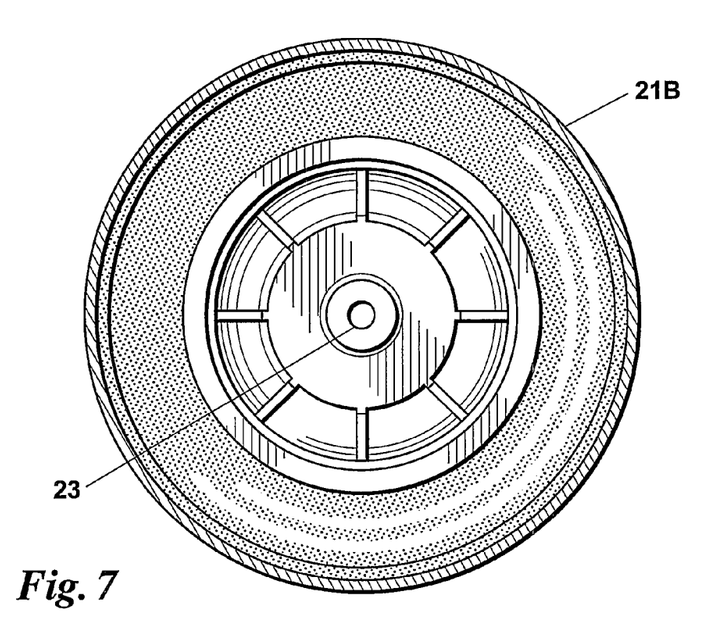
FIG. 7 is a view of the rearward end of the drive section of FIG. 1 taken along section line 7-7 of FIG. 1.
Figure 8:
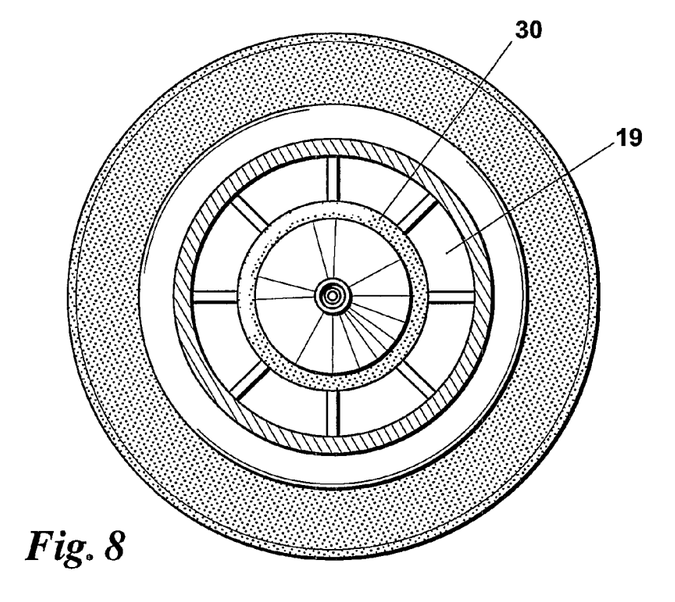
FIG. 8 is a view of the rearward portion of the speed control drive section of FIG. 1 taken along section line 8-8 of FIG. 2.

A primary bypass flow control valve 30 is located at the rearward end 15 of body 11. Primary valve 30, which is preferably an active control type valve, regulates the amount of bypass flow through passageway 17. In a preferred embodiment, primary valve 30 is a plug valve. The external surface of primary valve 30 is preferably shaped in relation to the profile of the reduced throat area 19 of central passageway 17. Controller 27 sends signals to primary valve 30 in response to deviations in speed of the tool or drive section 10 relative to a desired target speed. The primary valve 30 then moves fore and aft, opening and closing the throat area 19 to allow more or less bypass flow through passageway 17, thereby adjusting the speed of drive section 10. When primary valve 30 is in the fully closed position (see FIG. 1), a predetermined minimum amount of bypass flow is achieved and the speed of drive section 10 is increased. When primary valve 30 is in the fully opened positioned (see FIG. 3), a predetermined maximum amount of bypass flow is achieved and the speed of drive section 10 is reduced.

Referring now to FIGS. 3 to 6, a failsafe valve 50 is located toward the forward end 13 of body 11. Failsafe valve 50 is actuated in cases in which primary valve 30 has failed, thereby providing a means to retrieve drive section 10 and any associated tools from the interior of the pipeline. Prior to deploying drive section 10 into the pipeline, failsafe valve is placed under the control of a controller 27. The controller 27 is programmed to release the failsafe valve under prescribed failure conditions, for example, a fixed time duration that is several hours longer than the planned inspection time for the pipeline. Should primary valve 30 fail in the open position, the failsafe valve 50 would close, bypass flow through central passageway 17 would be inhibited or reduced; and drive section 10 would begin moving forward.

In a preferred embodiment, failsafe valve 50 is a butterfly-type valve having a spring-loaded hinge 55 opposing leaves 53A and 53B. A divider housing 51 houses a retaining means 57 for holding failsafe valve 50 in a fully opened position. Retaining means 57 may be a pin 59 in contact with a pin receiver 61 located on one of the leaves 53. In response to a predetermined state or event—such as drive section 10 being stalled and remaining in the pipeline for a period of time equal to a predetermined amount of time—pin 59 retracts from pin receiver 61 and the leaves 53 substantially instantaneously move between the opened and closed positions. In the closed position, failsafe valve 50 prevents bypass flow from flowing through central passageway 17 or may limit the amount of bypass flow to a predetermined minimum. Differential pressure across the closed leaves 53 of failsafe valve 50 serve to reinforce the closing forces on the valve 50 provided by spring-loaded hinge 55.

While a speed control drive section having a failsafe valve has been described with a certain degree of particularity, many changes may be made in the details of construction and the arrangement of components without departing from the spirit and scope of this disclosure. A drive section according to this disclosure, therefore, is limited only by the scope of the attached claims, including the full range of equivalency to which each element thereof is entitled

What is claimed is:

1. A system for retrieving a pipeline tool from an interior space of a pipeline, the system comprising:
    a speed control drive section, said speed control drive section having a bypass flow passageway and a primary bypass flow control valve;
    a failsafe valve located in said bypass flow passageway; and
    a retaining means for holding said failsafe valve in an opened position;
    said retaining means releasing said failsafe valve in response to a prescribed failure condition.

2. A system according to claim 1 further comprising a controller, said controller controlling said retaining means.

3. A system according to claim 1 further comprising the prescribed failure condition being at least one of a timed event and a primary bypass flow control valve failure event.

4. A system according to claim 1 further comprising said primary bypass flow control valve is a plug type valve.

5. A system according to claim 1 further comprising said failsafe valve is a butterfly type valve.

6. For retrieving a pipeline tool from an interior space of a pipeline, a speed control drive section in communication with the pipeline tool comprising:
    a longitudinal body having a central bypass flow passageway and at least one external circumferential sealing element;
    a primary bypass flow control valve;
    a failsafe valve; and
    a means for deploying said failsafe valve between a first and second position, said means being responsive to a preset value.

7. A speed control drive section according to claim 6, the preset value is a predetermined total residence time of the pipeline tool within the pipeline.

8. A speed control drive section according to claim 6 further comprising a means for holding said failsafe bypass flow valve in an opened position.

9. A speed control drive section according to claim 6, said failsafe bypass flow valve is located forward said primary bypass flow valve.

10. A speed control drive section according to claim 6, the first position being an opened position as said primary bypass flow valve regulates bypass flow through said central bypass flow passageway.

11. A speed control drive section according to claim 6 further comprising said primary bypass flow valve is a plug type valve.

12. A speed control drive section according to claim 6 further comprising said failsafe valve is a butterfly type valve.

* * * * *